United States Patent
Zhu et al.

(10) Patent No.: US 7,433,155 B2
(45) Date of Patent: Oct. 7, 2008

(54) SLIDER HAVING RECESSED CORNER FEATURES

(75) Inventors: Jianxin Zhu, Eagan, MN (US); Zine-Eddine Boutaghou, North Oaks, MN (US); Zheng Shi, San Jose, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 380 days.

(21) Appl. No.: 11/000,554

(22) Filed: Dec. 1, 2004

(65) Prior Publication Data

US 2006/0114611 A1   Jun. 1, 2006

(51) Int. Cl.
*G11B 5/60* (2006.01)
(52) U.S. Cl. .................................... 360/235.7
(58) Field of Classification Search ............... 360/235.7
See application file for complete search history.

(56) References Cited

U.S. PATENT DOCUMENTS

| | | | |
|---|---|---|---|
| 5,872,686 A | 2/1999 | Dorius et al. | 360/103 |
| 6,069,769 A | 5/2000 | Dorius et al. | 360/103 |
| 6,504,681 B1 | 1/2003 | Sawada | 360/235.6 |
| 6,504,684 B1 | 1/2003 | Danielson et al. | 360/244.8 |
| 6,525,909 B1 | 2/2003 | Qian et al. | 360/235.7 |
| 6,552,876 B1 * | 4/2003 | Berg et al. | 360/235.7 |
| 2002/0063995 A1 * | 5/2002 | Sannino et al. | 360/236.3 |

FOREIGN PATENT DOCUMENTS

JP    01245480 A  *  9/1989

* cited by examiner

*Primary Examiner*—David D Davis
(74) *Attorney, Agent, or Firm*—Westman, Champlin & Kelly, P.A.

(57) ABSTRACT

One aspect of the present invention relates to a slider having a slider body. The slider body includes a bearing surface defining a bearing surface plane, a leading edge, a trailing edge, first side edge, a second side edge and at least one corner. A corner feature is positioned proximate the at least one corner. The corner feature includes a first portion oriented in a first direction and a second portion oriented in a second direction that is different then the first direction. At least one of the first direction and the second direction is toward the trailing edge and is oblique to the bearing surface plane.

24 Claims, 6 Drawing Sheets

SLIDER HAVING RECESSED CORNER FEATURES

BACKGROUND OF THE INVENTION

The present invention relates to data storage systems and, more particularly, to a data storage system having a slider with features for reduced slider-media impact.

Data storage systems such as disc drives are well known in the industry. Such drives use rigid discs, which are coated with a magnetizable medium for storage of digital information in a plurality of circular, concentric data tracks. The discs are mounted on a spindle motor, which causes the discs to spin and the surfaces of the discs to pass under respective hydrodynamic (e.g. air) bearing disc head sliders. The sliders carry transducers, which write information to and read information from the disc surfaces.

An actuator mechanism moves the sliders from track-to-track across the surfaces of the discs under control of electronic circuitry. The actuator mechanism includes a track accessing arm and a suspension for each disc head slider. The suspension includes a load beam and a gimbal. The load beam provides a load force which forces the slider toward the disc surface. The gimbal is positioned between the slider and the load beam, or is integrated in the load beam, to provide a resilient connection that allows the slider to pitch and roll while following the topography of the disc.

The slider includes a hydrodynamic (e.g. air) bearing surface, which faces the disc surface. As the disc rotates, the disc drags air under the slider and along the bearing surface in a direction approximately parallel to the tangential velocity of the disc. As the air passes beneath the bearing surface, air compression along the air flow path causes the air pressure between the disc and the bearing surface to increase, which creates a hydrodynamic lifting force that counteracts the load force and causes the slider to fly above or in close proximity to the disc surface.

In ramp load-unload applications, the disc drive further includes a ramp positioned at an outer diameter of the disc for engaging the suspension. When the disc drive is powered down, the actuator mechanism moves the suspension radially outward until the suspension engages the ramp, causing the slider to lift off of the disc surface. In the case of a slider having a subambient pressure cavity, the suspension and slider must overcome the suction force developed by the subambient pressure cavity (which tends to pull the slider toward the disc) in order to lift the slider up the ramp. During power-up, the disc is accelerated to its normal operating velocity and then the actuator mechanism moves the suspension radially inward such that the suspension disengages the ramp allowing the slider to become loaded on to the disc surface.

Using a ramp to load and unload the suspension relative to the disc surface has been regarded as an attractive alternative to "contact start/stop" technology in which the slider lands and takes-off from a dedicated zone on the disc surface. The ramp load-unload technique can be used for solving tribological problems associated with lower fly heights and for meeting severe requirements of non-operational shock performance. However, this technique introduces an array of other challenges, such as possible severe head-media impact during loading and unloading operations.

Under nominal conditions, advanced air bearings (AABs) can be designed to avoid head-media contact during load and unload. Manufacturing of actual parts, however, introduces deviation from nominal conditions, which can result in larger susceptibility of impact during load-unload operations.

Among the numerous dimensions and geometrical features to be controlled during manufacturing, pitch static attitude (PSA) and roll static attitude (RSA) are the most critical parameters for load-unload applications. PSA is the angle formed between the slider and the suspension in a direction parallel to the suspension's axis of symmetry when no air bearing is formed (i.e., in a "static" state). RSA is the angle formed between the slider and the suspension in a direction perpendicular to the suspension's axis of symmetry.

Since PSA and RSA have an influence on the pitch and roll attitude of the slider during flight, manufacturing tolerances that result in a non-optimal PSA or RSA cause the slider to tilt with respect to the radial motion of the suspension during loading and unloading operations. Under these conditions, it is possible that the corners of the slider can become close enough to the media to induce light contact or severe impact. When the slider is being loaded onto the disc, a corner or edge of the slider can contact the disc before an air bearing has been developed. During unloading, imbalances between the suction force and the lift force can also cause the slider to contact the disc. This contact can cause damage to stored data, thermal asperities and permanent physical damage to the slider and disc surfaces.

Similarly, in a contact-start-stop system, a corner of the slider can contact the disc in response to shock forces applied to the disc drive or other events that cause a variation in the flying height of the slider. Any such contact leads to wear of the slider and the recording surface and is potentially catastrophic.

One method of reducing damage caused by contact between the slider and the disc is to provide landing pads on the slider, which have a smoother contact surface than the etched surfaces on the slider body. The landing pads can be below or within the pressurization plane of the bearing surface. Another method of reducing damage caused by contact between the slider and the disc is to provide the bearing surface with at least one rounded corner. Also, the non-bearing surfaces can be provided with at least one rounded edge or a deeply recessed corner. As a result, the disc surface is less likely to be damaged when hit by the rounded corner or edge than a sharp corner or edge.

However, strong contact can still occur with the above-mentioned methods due to inadequate pressurization at different PSA and RSA conditions. A slider is therefore desired that avoids or reduces contact with the disc surface during operational shock events and/or during load and unload operations.

SUMMARY OF THE INVENTION

One aspect of the present invention relates to a slider having a slider body. The slider body includes a bearing surface defining a bearing surface plane, a leading edge, a trailing edge, a first side edge, a second side edge and at least one corner. A corner feature is positioned proximate the at least one corner. The corner feature includes a first portion oriented in a first direction and a second portion oriented in a second direction that is different from the first direction. At least one of the first direction and the second direction is toward the trailing edge and is oblique to the bearing surface plane.

Another aspect of the present invention relates to a slider body having a leading edge, trailing edge, a first side edge, a second side edge and first and second corners at opposing ends of the trailing edge. First and second corner features are positioned proximate the first and second corners and first and second side edges, respectively. The first and second corner features each define an opening such that fluid flow from the trailing edge can enter each opening.

A further aspect of the present invention relates to a slider body. The slider body includes a leading edge, a trailing edge, first and second side edges and first and second corners at opposing ends of the trailing edge. Fluid pressure is generated at the first and second corners to prevent impact between the slider body and the storage medium.

DETAILED DESCRIPTION OF ILLUSTRATIVE EMBODIMENTS

Figure 1:
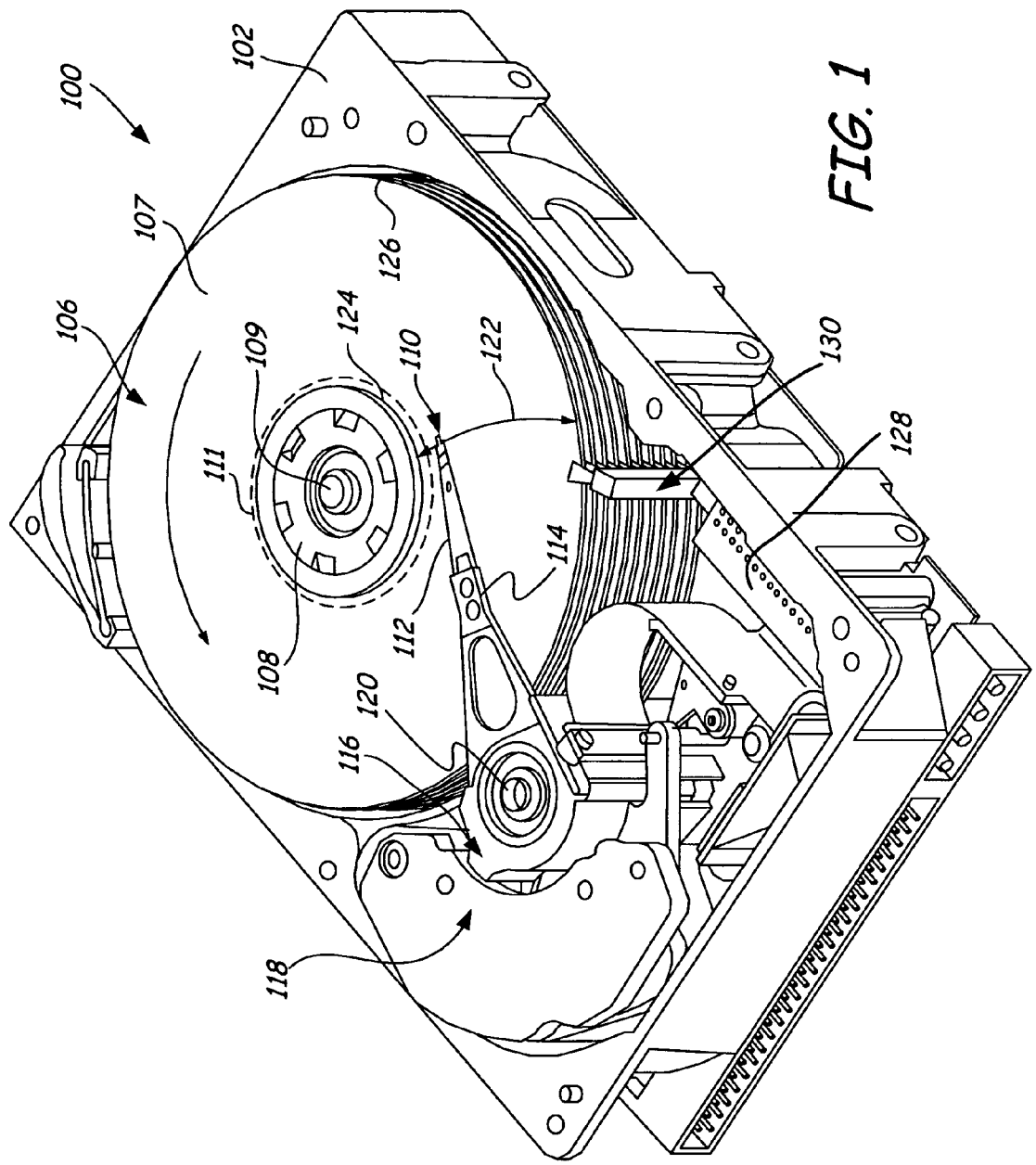
FIG. 1 is a perspective view of a disc drive in which the present invention is useful.

FIG. 1 is a perspective view of a disc drive 100 in which the present invention is useful. Disc drive 100 can be configured as a traditional magnetic disc drive, a magneto-optical disc drive or an optical disc drive, for example. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs 107, which are mounted for co-rotation about central axis 109. Each disc surface has an associated slider 110, which is mounted to disc drive 100 and carries a read/write head for communication with the disc surface. It is worth noting that although a plurality of individual discs is illustrated in FIG. 1, the present invention can also be applied to disc drives having a single disc.

In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached sliders 110 about a pivot shaft 120 to position sliders 110 over a desired data track along a path 122 between a disc inner diameter 124 and a disc outer diameter 126. Voice coil motor 118 operates under control of internal circuitry 128. Other types of actuators can also be used, such as linear actuators.

As discussed in more detail below, slider 110 has a hydrodynamic (e.g., air) bearing that reduces the chance of head-media contact in ramp load-unload applications and in contact start-stop applications. In ramp load-unload applications, disc drive 100 includes a ramp 130 for each suspension 112. Ramps 130 are positioned near disc outer diameter 126. When disc drive 100 is powered-down, voice coil motor 118 rotates actuator 116 toward disc outer diameter 126 so that suspensions 112 engage the respective ramps 130. Ramps 130 lift suspensions 112 so that sliders 110 are unloaded from the disc surface. During power-up, once discs 107 have accelerated to their operating rotation velocity, voice coil motor 118 rotates actuator 116 in a radially inward direction to disengage suspensions 112 from ramps 130 and thereby load sliders 110 onto the disc surfaces. When sliders 110 are loaded onto the disc surfaces, the ramp unloading process introduces a roll motion in the sliders. Depending upon the magnitude of the roll motion, the pitch static angle (PSA) of the suspension, and the roll static angle (RSA) of the suspension, it is possible that the tilt of a typical slider with respect to the radial load-unload motion of actuator 116 can cause the edges or corners of the slider to contact the disc surface. This contact can range from light contact to severe impact and can cause damage to stored data or permanent physical damage to the media. Sliders 110 have a bearing geometry that reduces the chances and severity of such contact.

Figure 2:
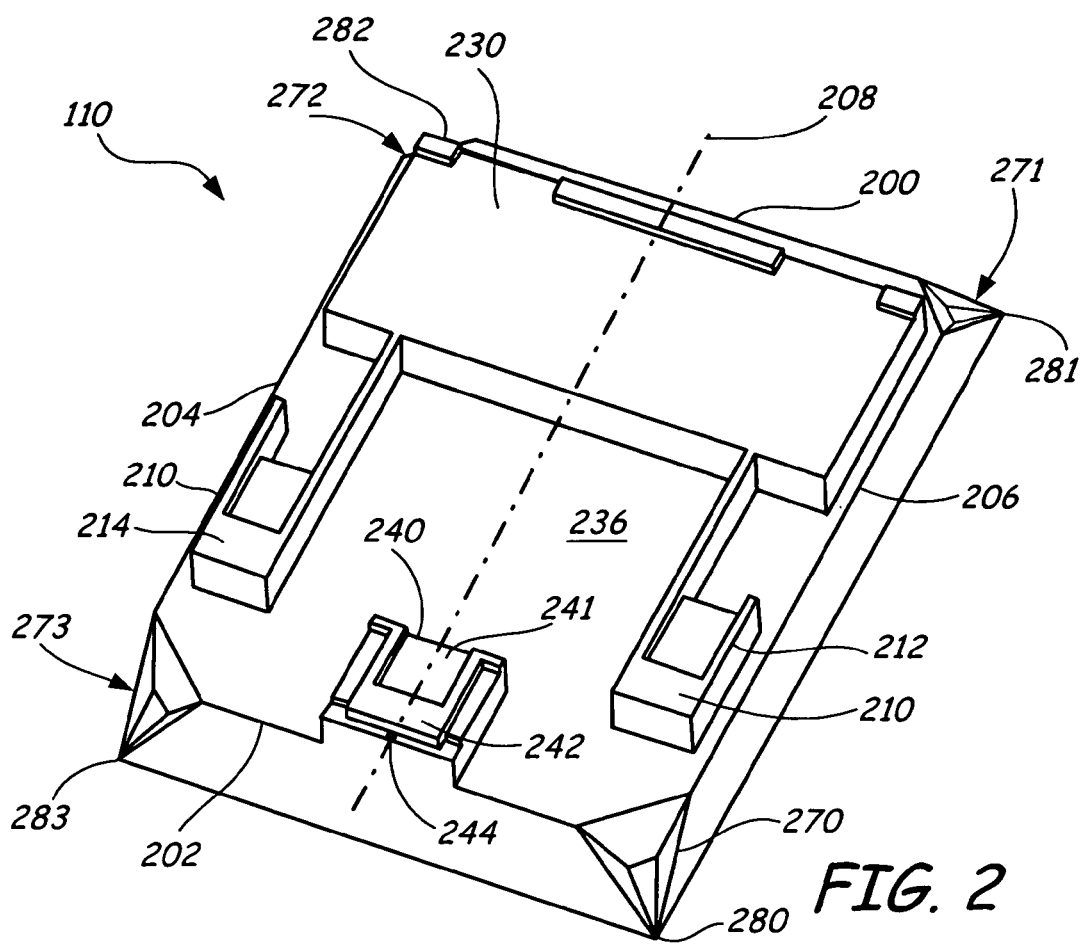
FIG. 2 is a bottom, perspective view of a slider shown in FIG. 1, as viewed from the surface of a disc, according to one embodiment of the present invention.

FIG. 2 is a bottom, perspective view of one of the sliders 110 of FIG. 1, as viewed from the surface of disc 107 according to one embodiment of the present invention. The vertical dimensions of slider 110 are greatly exaggerated in FIG. 2 for clarity. Slider 110 includes features and at least one bearing surface for generating a force to lift slider 110 above the surface of disc 107. The at least one bearing surface defines a bearing surface plane, which provides a reference for other features and surfaces on slider 110.

Slider 110 has a leading edge 200, a trailing edge 202, side edges 204 and 206, and a lateral center line 208. Elongated, raised side rails 210 and 212 are positioned along side edges 204 and 206, respectively, and form bearing surfaces 214 and 216, respectively. Rails 210 and 212 extend generally from leading slider edge 200 toward trailing slider edge 202 and terminate prior to trailing slider edge 202. However, rails 210 and 212 can extend all the way to trailing slider edge 202 in alternative embodiments. Additionally, the rails illustrated herein are illustrative and other rail configurations can be used in accordance with embodiments of the present invention.

A cavity dam 230 extends between rails 210 and 212, along leading slider edge 200. Cavity dam 230 has a leading edge 232 and a trailing edge 234. Cavity dam 230 and side rails 210 and 212 define a subambient pressure cavity (or "central recess") 236, which trails cavity dam 230 relative to a direction of air flow from the leading slider edge 200 toward trailing slider edge 202. In one embodiment, central recess 236 is recessed from bearing surfaces 214 and 216 by 1 to 3 µm. Other depths can also be used. In addition, cavity dam 230 can be formed with a tapered leading edge in alternative embodiments, if desired.

A raised center pad or rail 240 is positioned along trailing slider edge 202. In alternative embodiments, center pad 240 can be skewed or offset with respect to a center of the slider. Center pad 240 has a leading step surface 241 and a bearing surface 242. Leading step surface 241 is generally parallel to and recessed from bearing surface 242 by a step depth of 0.1 to 0.5 µm, for example, for providing pressurization of bearing surface 242 from air flow venting from central recess 236. Center rail 240 supports a read/write transducer 244 along trailing slider edge 202. In alternative embodiments, transducer 244 can be positioned at other locations on slider 110.

However, when placed at or near trailing slider edge 202, transducer 244 is located at the closest point on slider 110 to the surface of disc 107 (shown in FIG. 1) under most nominal operating conditions. With a positive pitch angle, trailing slider edge 202 is closer to the surface of disc 107 than leading slider edge 200.

Rails 210 and 212 terminate prior to trailing slider edge 202 to allow slider 110 to roll about lateral center line 208 without risking contact between trailing rail edges and the disc surface at nominal roll angles. Therefore, the trailing edge of center pad 240 remains the closest location on slider 110 to the disc surface during flight at nominal roll angles, thereby improving read and write performance.

Slider 110 further includes recessed corner features 270-273, which are positioned at and form part of corners 280-283, respectively, of slider 110. Recessed corner features 270-273 further reduce the chance of contact between slider 110 and the disc surface during ramp load and unload operations and in response to operating shock events. In the embodiment illustrated, recessed corner features 270-273 are recessed from bearing surfaces 214 and 216 by a depth that is greater than the depth of central recess 236.

During ramp load and unload operations and during operational shock events, recessed corner surfaces 270-273 can delay contact between slider 110 and the surface of the disc at corners 280-283 by allowing greater roll angles about lateral center line 208. The extra time allows slider 110 to reposition itself in order to develop the air bearing pressure needed to lift the slider away from the disc surface before contact occurs. Even if contact occurs, the overall impact with the disc surface is substantially reduced. In one embodiment, the sizes and shapes of recessed corner surfaces 270-273 are chosen to maximize the delay of contact at the pitch and roll attitudes at which contact is possible.

Figure 3:
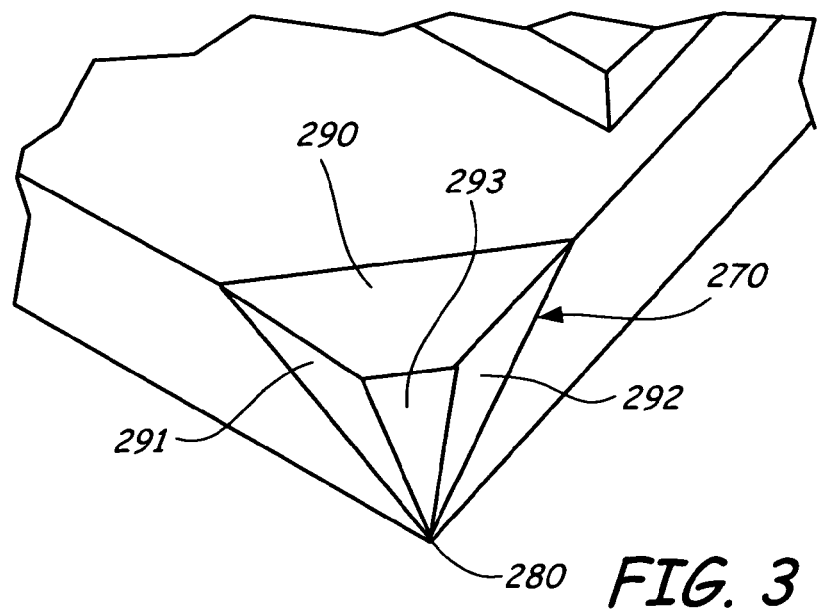
FIG. 3 is a detailed view of a corner of the slider shown in FIG. 2.

FIG. 3 is a detailed view of corner 280 of slider 110 in FIG. 2. Recessed corner feature 270 is cup-shaped and includes recessed surfaces or portions 290-293 that define an opening such that fluid flow can enter the opening from trailing edge 202 and side edge 206. Features 271-273 are similar to recessed feature 270. As illustrated, each of the surfaces 290-293 has a different surface normal direction or orientation creating an overall cup shape. Additionally, each of the surfaces 290-293 is oblique to the bearing surface plane, which is defined by bearing surfaces 214 and 216, for example. Recessed feature 270 generates pressurization over a large range of pitch static angles and roll static angles. An effective air bearing is generated on recessed feature 270 through the multi-plane surfaces in order to adapt to different pitch and roll attitude situations experienced during load/unload operations. As a result, the recessed feature 270 avoids and/or delays direct head-media contact and furthermore minimizes head-media impact while maximizing air bearing lift. Additionally, recessed feature 270 eliminates a sharp corner on the body of slider 110 and thus contact damage and particle generation is reduced in the event of contact between slider 110 and a disc surface. If desired, feature 270 can include a surface microstructure for lower contact friction force in the event of head-media impact. Moreover, recessed feature 270 has a greater depth than central recess 236 and thus has limited effect on the fluid pressure generated by the bearing surface on the slider body during operation of the disc drive.

Figure 9:
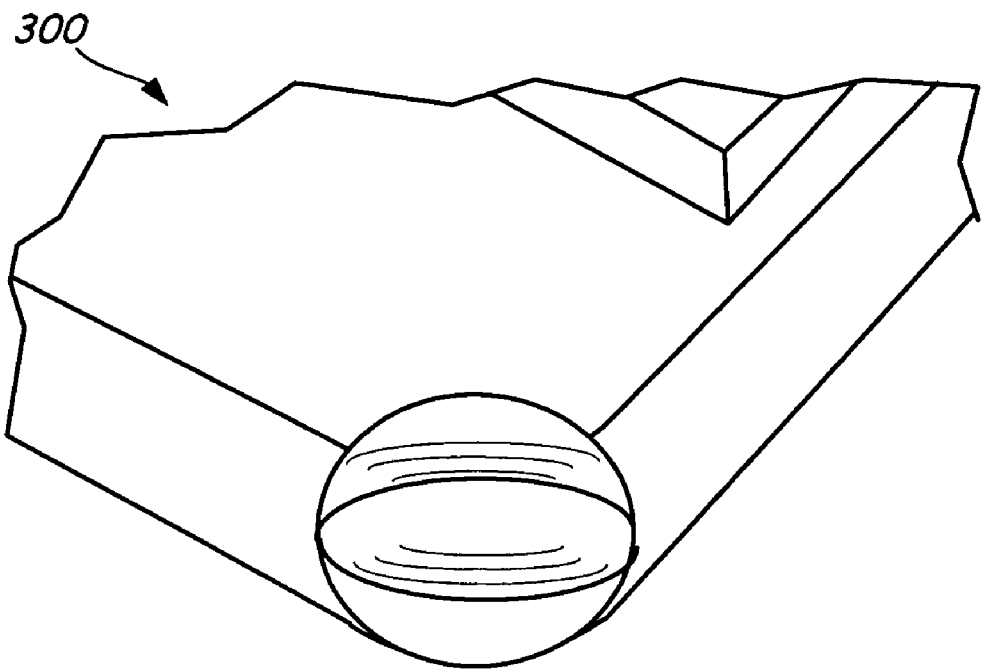
FIG. 9 is a detailed view of a corner of the slider shown in FIG. 2 according to an alternative embodiment.
Figure 10:
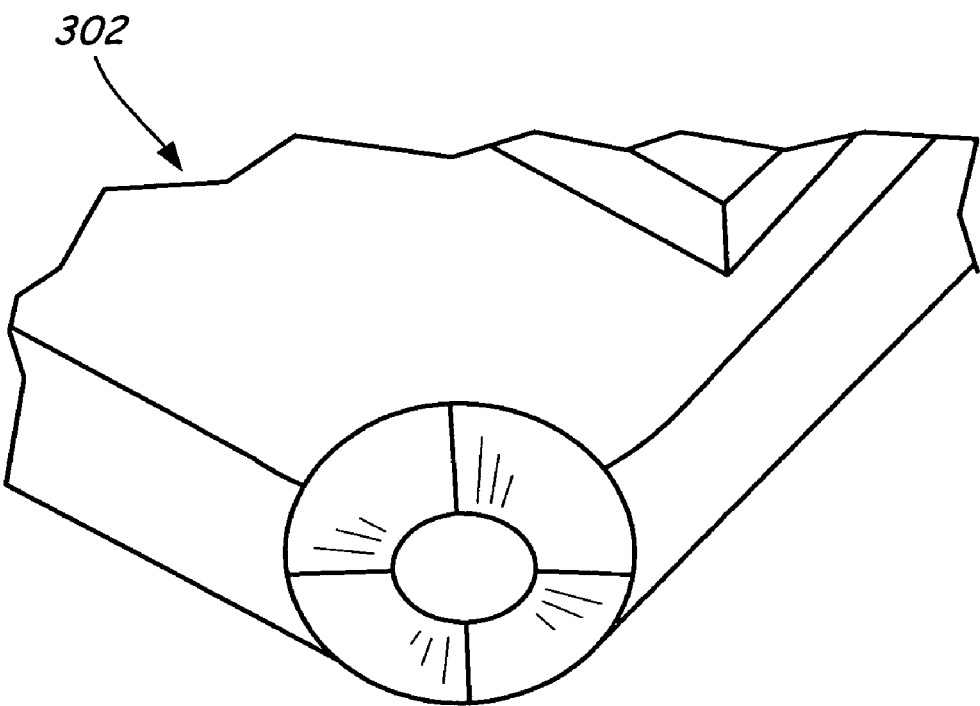
FIG. 10 is a detailed view of a corner of the slider shown in FIG. 2 according to an alternative embodiment.

It should further be noted that recessed feature 270 can include various shapes, sizes, etc. in accordance with the present invention. For example, the recessed feature 270 can include one or more arcuate or curved surfaces such as a spherical or conical shape to form a concave or convex surface with respect to a corner. FIGS. 9 and 10 illustrate recessed-shaped features 300 and 302, respectively, that have openings facing the trailing edge. Recessed-shaped feature 300 is a generally spherical shape while cup-shaped feature 302 is generally conically shaped. Features 300 and 302 both include a first portion oriented in a first direction and a second portion oriented in a second direction that is different from the first direction. Together, the first and second portions define an arcuate surface that develops air bearing pressure at the corner of a slider during ramp load and unload operations.

Figure 4:
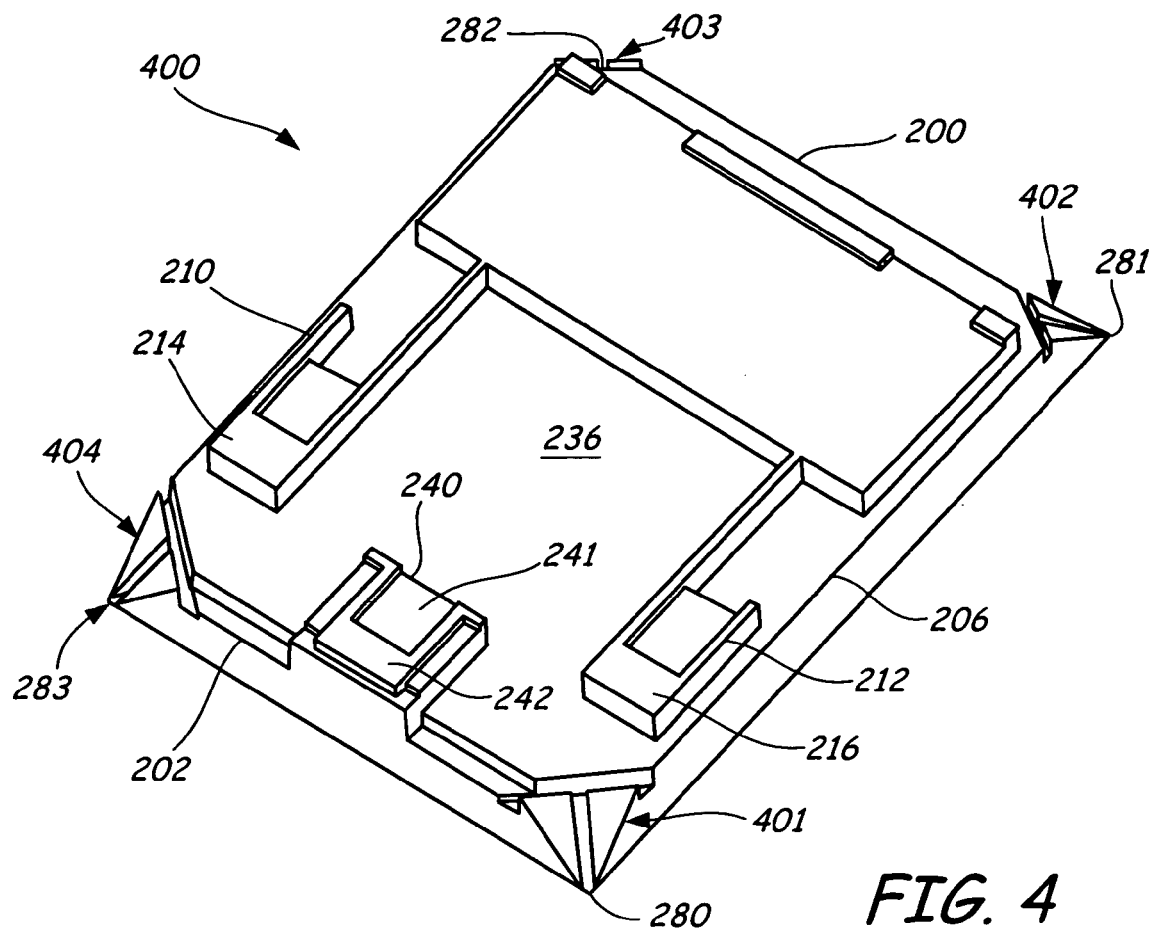
FIG. 4 is a bottom, perspective view of a slider, as viewed from the surface of a disc, according to an alternative embodiment of the present invention.
Figure 5:
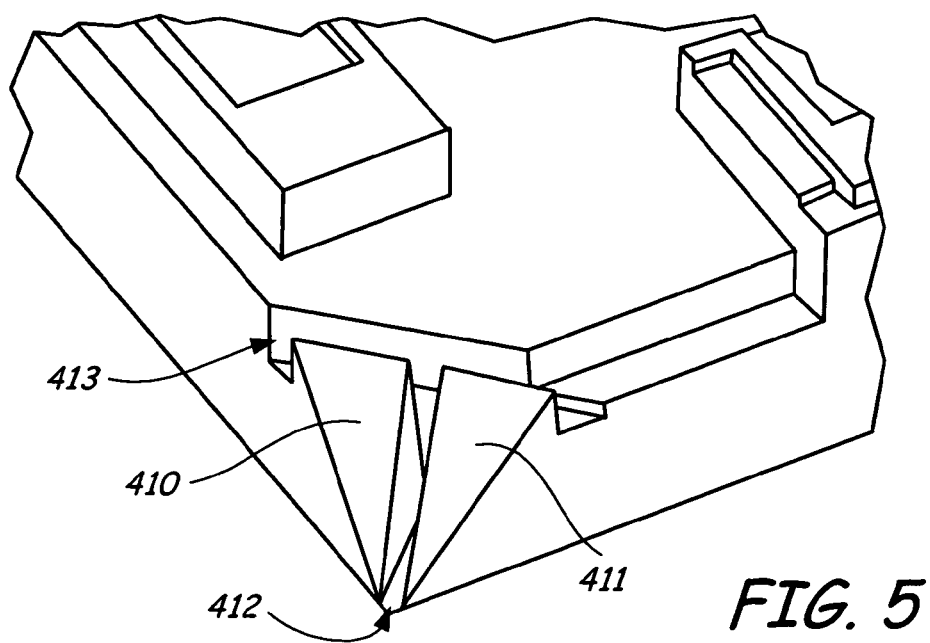
FIG. 5 is a detailed view of a corner of the slider shown in FIG. 4.

FIG. 4 is a perspective view of a slider 400 according to an alternative embodiment of the present invention. The same reference numerals are used in FIG. 4 as were used in FIGS. 2-3 for the same or similar elements. Once again, the vertical dimensions in FIG. 4 are exaggerated for clarity. Slider 400 includes recessed corner features 401-404 that form part of corners 280-283, respectively. As illustrated in FIG. 5, exemplary corner feature 404 includes recessed surfaces 410 and 411 oblique to the bearing surface plane. Features 401-403 are similar to feature 404. The surfaces 410 and 411 are illustrated as being parallel, but could be oriented with different surface normal directions. Feature 401 also includes a trench 412 positioned between surfaces 410 and 411 and recessed from the surfaces 410 and 411. An additional trench 413 is connected to and orthogonally oriented with respect to trench 412. Together, trench 412 and trench 413 define an opening such that fluid flow can enter the opening from the trailing edge 202 and side edge 206. As slider 400 rolls towards a disc surface, air enters trench 412, which provides pressure on surfaces 410 and 411. This pressurization aids in preventing contact between slider 400 and a disc surface. If desired, trench 412 can have a variable depth in order to increase pressurization of surfaces 410 and 411. Feature 401 can be made using gray scale photolithography by linking trenches 412 and 413 together.

Figure 6:
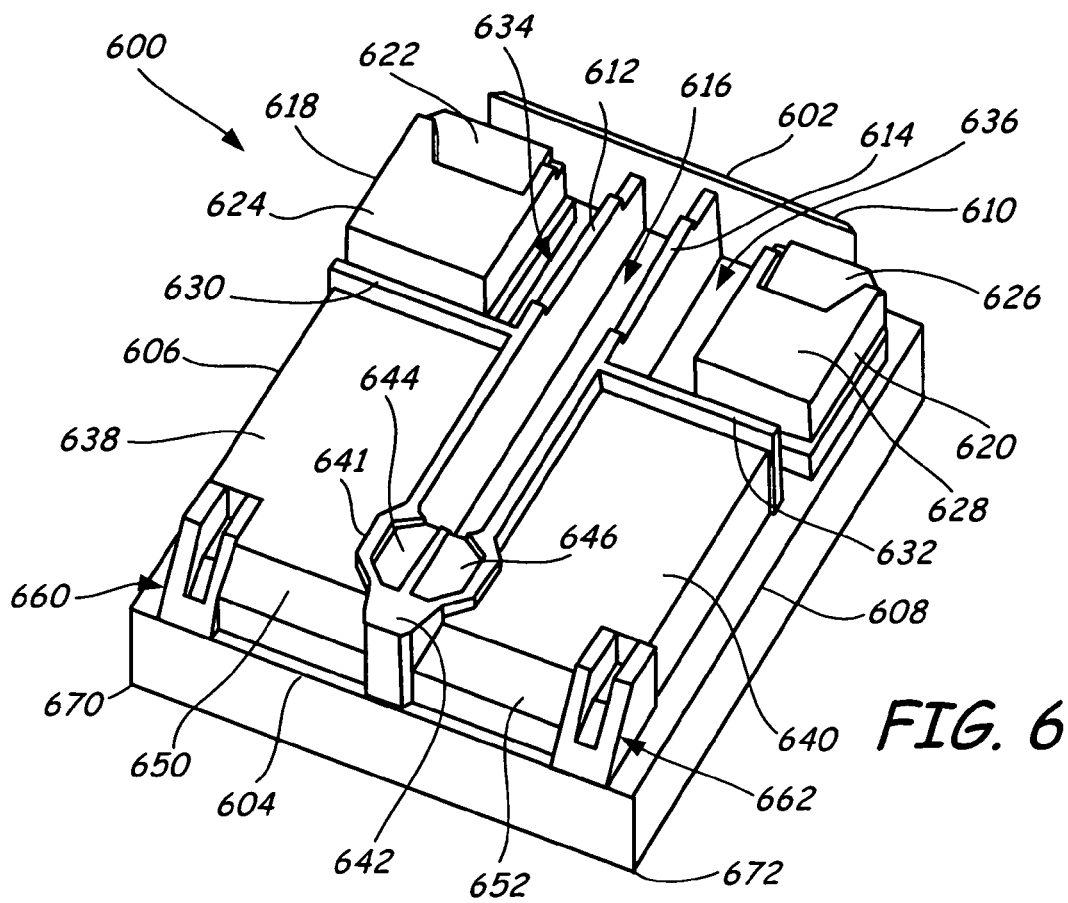
FIG. 6 is a bottom, perspective view of a slider, as viewed from the surface of a disc, according to an alternative embodiment of the present invention.

FIG. 6 is a perspective view of a slider 600 according to an alternative embodiment of the present invention. Slider 600 has a leading edge 602, a trailing edge 604 and side edges 606 and 608. A raised longitudinal wall 610 is positioned proximate leading edge 604. Two longitudinally extending walls 612 and 614 extend from wall 610 towards trailing edge 604 and define a central recess 616. Forward pads 618 and 620 are provided near side edges 606 and 608, respectively. Pad 618 includes a leading step surface 622 and a trailing bearing surface 624. Likewise, pad 620 includes a leading step surface 626 and a trailing bearing surface 628. Slider 600 further includes lateral walls 630 and 632 extending from longitudinal walls 612 and 614, respectively. An L-shaped trench 634 is formed by pad 618, wall 612 and wall 630. Likewise, an L-shaped trench 636 is formed by pad 620, wall 614 and wall 632. Step surfaces 638 and 640 extend from lateral walls 630 and 632, respectively, toward trailing edge 604. A center pad 641 forming a bearing surface 642 is provided proximate the center of trailing edge 604. Step surfaces 644 and 646 are also formed on the center pad. Additionally, an oblique trailing surface 650 is provided adjacent to step surface 638 and a corresponding obliquely oriented surface 652 is provided adjacent step surface 640.

Figure 7:
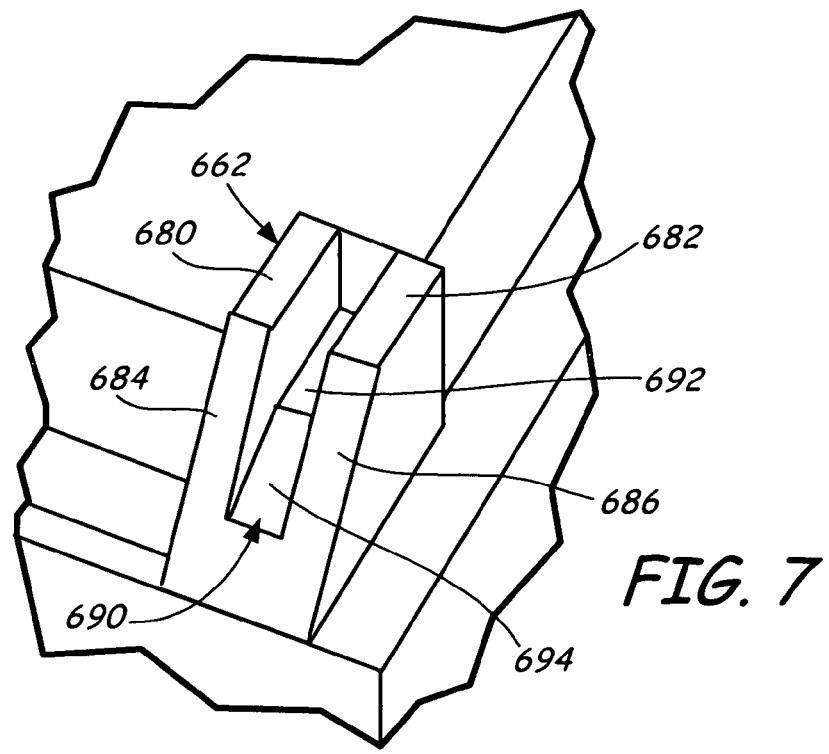
FIG. 7 is a detailed view of a corner of the slider shown in FIG. 6.

Slider 600 further includes corner features 660 and 662, which are positioned proximate corners 670 and 672, respectively. FIG. 7 illustrates a detailed view of feature 662. Feature 662 includes top surfaces 680 and 682 and oblique surfaces 684 and 686. A trench 690 is positioned between surfaces 680 and 682 and includes a top trench surface 692 and oblique trench surface 694. The trench 690 defines an opening such that fluid flow can enter from trailing edge 604. As trailing edge 604 of slider 600 is tilted towards a disc surface, air entering features 660 and 662 is pressurized, which creates a lifting force to prevent contact of slider 600 and the disc surface.

Figure 8:
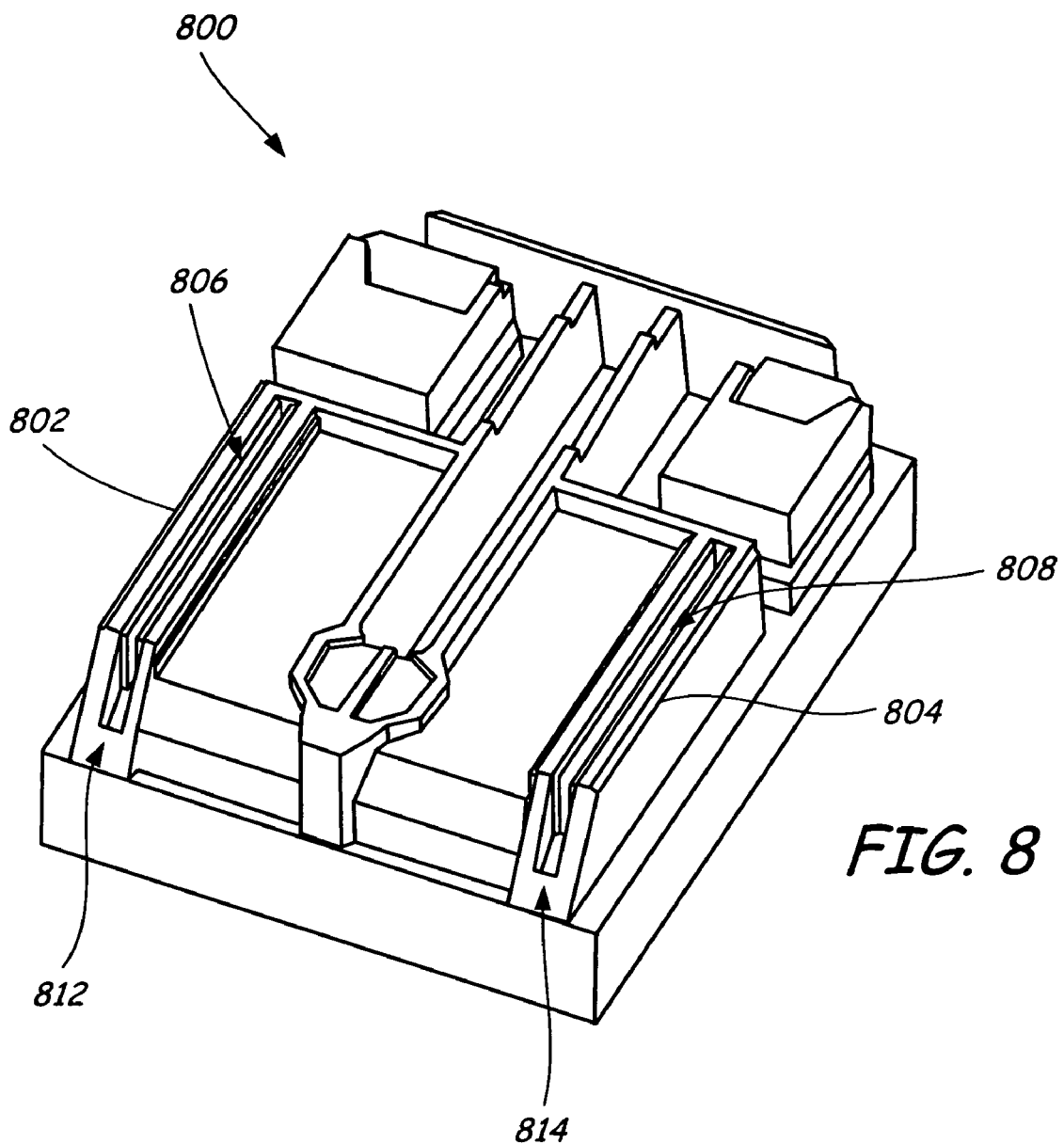
FIG. 8 is a bottom, perspective view of a slider, as viewed from the surface of a disc, according to an alternative embodiment of the present invention.

FIG. 8 is a perspective view of a slider 800 according to an alternative embodiment of the present invention. The same reference numerals are used in FIG. 8 as were used in FIG. 6 for the same or similar elements. In this embodiment, slider 800 includes side rails 802 and 804 extending from lateral walls 630 and 632, respectively, to trailing edge 604. Side rails 802 and 804 define deeply recessed trenches 806 and 808, respectively. Corner features 802 and 804 are formed at the trailing edge of side rails 812 and 814, respectively and act to generate pressure at trailing edge 604 to prevent contact between slider 800 and a surface of a disc.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the data storage system while maintaining substantially the same functionality without departing from the scope and spirit of the present invention. In addition, it will be appreciated by those skilled in the art that the teachings of the present invention can be applied to other types of sliders having various configurations for flying above the surface of a storage medium without departing from the scope and spirit of the present invention. Also, the present invention can be used with any type of ramp load-unload or contact start-stop suspension, such as rotary and linear suspensions, and the transducing head can be of any type such as magnetic, magneto-resistive, optical or magneto-optical, for example.

What is claimed is:

1. A slider comprising:
   a slider body having a bearing surface defining a bearing surface plane, a recessed surface displaced from the bearing surface plane, a leading edge, a trailing edge surface, a first side edge surface, a second side edge and at least one corner positioned between the trailing edge surface and the first side edge surface; and
   a corner feature positioned proximate the at least one corner and including a top edge adjacent to the recessed surface, a corner trailing edge adjacent to the trailing edge surface and a corner side edge adjacent to the first side edge surface, the corner feature including a first non-edge portion having a first surface oblique to the bearing surface plane and a second non-edge portion having a second surface oblique to the first surface.

2. The slider of claim 1 and further comprising:
   first and second rails disposed on the slider body about a central recess and forming first and second bearing surfaces, respectively, wherein the central recess has a depth measured from the first and second bearing surfaces.

3. The slider of claim 2, wherein the corner feature has a greater depth measured from the first and second bearing surfaces than the central recess.

4. The slider of claim 1, wherein the first portion is a first planar surface and the second portion is a second planar surface intersecting the first planar surface.

5. The slider of claim 1, wherein the corner features includes four intersecting surfaces arranged to form a cup-shaped feature.

6. The slider of claim 1, wherein the corner feature includes two surfaces oblique to the bearing surface plane and a trench positioned between the two surfaces, the trench recessed with respect to the two surfaces.

7. The slider of claim 6, wherein the two surfaces are parallel.

8. The slider of claim 1 wherein the slider body includes first and second corners at opposing ends of the trailing edge and first and second corner features positioned proximate the first and second corners, respectively.

9. The slider of claim 8 wherein the slider body includes third and fourth corners at opposing ends of the leading edge and third and fourth corner features positioned proximate the third and fourth corners, respectively.

10. The slider of claim 1 wherein the first portion and second portion define an arcuate surface.

11. The slider of claim 1 wherein the corner feature forms part of said at least one corner.

12. A slider comprising:
    a slider body having a leading edge, a trailing edge, a first side edge, a second side edge and first and second corners at opposing ends of the trailing edge; and
    first and second corner features positioned proximate the first and second corners and first and second side edges, respectively, the first and second corner features each including two surfaces oblique to the trailing edge and defining an opening forming a trench positioned between the two surfaces such that fluid flow from the trailing edge can enter each opening.

13. The slider of claim 12 wherein each opening is defined such that fluid flow from the each respective side edge can enter the opening.

14. The slider of claim 12 wherein each trench of each opening is perpendicular to the trailing edge.

15. The slider of claim 12 wherein each trench of each opening is oblique to the trailing edge.

16. The slider of claim 12 wherein the surfaces oblique to the trailing edge for each corner feature are parallel.

17. The slider of claim 12 wherein the first and second corner features form part of the first and second corners, respectively.

18. A slider comprising:
    a slider body having a leading edge, a trailing edge, first and second side edges and first and second corners at opposing ends of the trailing edge; and
    means for generating fluid pressure at the first and second corners to stabilize the slider body during a ramp load-unload operation that include at least three surfaces oriented in three directions that are different from one another.

19. The slider of claim 18 and further comprising:
    first and second openings positioned proximate the first and second corners, respectively; and
    means for allowing fluid to enter the first and second openings from the trailing edge.

20. The slider of claim 19 and further comprising:
    means for allowing fluid to enter the first and second openings from the first and second side edges.

21. The slider of claim 19 wherein the first opening is a first cup-shaped feature and the second opening is a second cup-shaped feature.

22. The slider of claim 21 wherein the first cup-shaped feature includes a plurality of intersecting surfaces and the second cup-shaped feature includes a plurality of intersecting surfaces.

23. The slider of claim 21 wherein the first cup-shaped feature includes an arcuate surface and the second cup-shaped feature includes an arcuate surface.

24. The slider of claim 18 wherein the slider body includes a first surface positioned proximate the first corner and oblique with respect to the trailing edge and a second surface positioned proximate the second corner and oblique to the trailing edge.

\* \* \* \* \*